United States Patent
Zadeh

(10) Patent No.: US 8,103,085 B1
(45) Date of Patent: Jan. 24, 2012

(54) SYSTEM AND METHOD FOR DETECTING FLAWS IN OBJECTS USING MACHINE VISION

(75) Inventor: Ali Moghaddam Zadeh, Greenville, SC (US)

(73) Assignee: Cognex Corporation, Natick, MA (US)

( * ) Notice: Subject to any disclaimer, the term of this patent is extended or adjusted under 35 U.S.C. 154(b) by 1089 days.

(21) Appl. No.: 11/860,800

(22) Filed: Sep. 25, 2007

(51) Int. Cl.
*G06K 9/00* (2006.01)

(52) U.S. Cl. .................................. 382/141; 356/237.1

(58) Field of Classification Search .................. 382/141; 356/237.1, 124, 237, 612; 348/126, 127
See application file for complete search history.

(56) References Cited

U.S. PATENT DOCUMENTS

| | | | |
|---|---|---|---|
| 3,069,654 A | 12/1962 | Hough | |
| 3,560,930 A | 2/1971 | Howard | |
| 3,899,240 A | 8/1975 | Gabor | |
| 3,936,800 A | 2/1976 | Ejiri et al. | |
| 3,986,007 A | 10/1976 | Ruoff | |
| 4,146,924 A | 3/1979 | Birk et al. | |
| 4,200,861 A | 4/1980 | Hubach et al. | |
| 4,295,198 A | 10/1981 | Copeland et al. | |
| 4,441,206 A | 4/1984 | Kuniyoshi et al. | |
| 4,567,610 A | 1/1986 | McConnell | |
| 4,581,762 A | 4/1986 | Lapidus et al. | |
| 4,618,989 A | 10/1986 | Tsukune et al. | |
| 4,637,055 A | 1/1987 | Taylor | |
| 4,647,979 A | 3/1987 | Urata | |
| 4,651,341 A | 3/1987 | Nakashima et al. | |
| 4,672,676 A | 6/1987 | Linger | |
| 4,679,075 A * | 7/1987 | Williams et al. | 348/127 |
| 4,707,647 A | 11/1987 | Coldren et al. | |
| 4,736,437 A | 4/1988 | Sacks et al. | |
| 4,783,829 A | 11/1988 | Miyakawa et al. | |
| 4,799,175 A | 1/1989 | Sano et al. | |
| 4,809,348 A | 2/1989 | Meyer et al. | |
| 4,823,394 A | 4/1989 | Berkin et al. | |
| 4,843,631 A | 6/1989 | Steinpichler et al. | |
| 4,845,765 A | 7/1989 | Juvin et al. | |
| 4,893,346 A | 1/1990 | Bishop | |

(Continued)

FOREIGN PATENT DOCUMENTS

DE        44 06 020        6/1995

(Continued)

OTHER PUBLICATIONS

"10-K SEC Filing—iQ 180 Products", Adaptive Optics Associates (Dec. 2003), 900 Coles Road Blackwood, NJ 08012-4683.

(Continued)

*Primary Examiner* — Wesley Tucker
*Assistant Examiner* — Aklilu Woldemariam
(74) *Attorney, Agent, or Firm* — William A. Loginov

(57) ABSTRACT

This invention overcomes the disadvantages of the prior art by providing a system and method for flexibly detecting flaws in the acquired runtime/live images of objects based upon an inspection process that employs a training or model image of the object. This system and method enables predetermined flaws, and other predetermined features, within predetermined tolerances, to be disregarded as a flaw at inspection time. Typically, flexible flaw detection and repositioning of the model image occurs locally with respect to predetermined flaws and imperfections, and is undertaken after the image is acquired and the model image has undergone a global affine transformation/positioning with respect to the runtime image. Subsequent inspection then occurs with a locally repositioned model image that subsumes any imperfection or variation that is to be disregarded.

17 Claims, 12 Drawing Sheets

U.S. PATENT DOCUMENTS

| | | | |
|---|---|---|---|
| 4,903,313 A | 2/1990 | Tachikawa | |
| 4,916,640 A | 4/1990 | Gasperi | |
| 4,955,062 A | 9/1990 | Terui | |
| 4,962,538 A | 10/1990 | Eppler et al. | |
| 4,972,359 A | 11/1990 | Silver et al. | |
| 4,972,494 A | 11/1990 | White et al. | |
| 4,979,223 A | 12/1990 | Manns et al. | |
| 5,027,417 A | 6/1991 | Kitakado et al. | |
| 5,033,099 A | 7/1991 | Yamada et al. | |
| 5,040,056 A | 8/1991 | Sager et al. | |
| 5,046,109 A | 9/1991 | Fujimori et al. | |
| 5,048,094 A | 9/1991 | Aoyama et al. | |
| 5,121,201 A | 6/1992 | Seki | |
| 5,146,510 A | 9/1992 | Cox et al. | |
| 5,164,998 A | 11/1992 | Reinsch et al. | |
| 5,168,530 A | 12/1992 | Peregrim et al. | |
| 5,177,420 A | 1/1993 | Wada | |
| 5,184,217 A | 2/1993 | Doering | |
| 5,210,798 A | 5/1993 | Ekchian et al. | |
| 5,233,541 A | 8/1993 | Corwin et al. | |
| 5,245,674 A | 9/1993 | Cass et al. | |
| 5,253,306 A | 10/1993 | Nishio | |
| 5,280,351 A | 1/1994 | Wilkinson | |
| 5,298,697 A | 3/1994 | Suzuki et al. | |
| 5,313,532 A | 5/1994 | Harvey et al. | |
| 5,317,645 A | 5/1994 | Perozek et al. | |
| 5,343,390 A | 8/1994 | Doi et al. | |
| 5,345,515 A | 9/1994 | Nishi et al. | |
| 5,347,595 A | 9/1994 | Bokser | |
| 5,351,310 A | 9/1994 | Califano et al. | |
| 5,365,596 A | 11/1994 | Dante et al. | |
| 5,384,711 A | 1/1995 | Kanai et al. | |
| 5,406,642 A | 4/1995 | Maruya | |
| 5,459,636 A | 10/1995 | Gee et al. | |
| 5,471,541 A | 11/1995 | Burtnyk et al. | |
| 5,481,712 A | 1/1996 | Silver et al. | |
| 5,495,537 A | 2/1996 | Bedrosian et al. | |
| 5,500,732 A * | 3/1996 | Ebel et al. | 356/124 |
| 5,515,453 A | 5/1996 | Hennessey et al. | |
| 5,524,064 A | 6/1996 | Oddou et al. | |
| 5,537,669 A | 7/1996 | Evans et al. | |
| 5,539,841 A | 7/1996 | Huttenlocher et al. | |
| 5,555,317 A | 9/1996 | Anderson | |
| 5,555,320 A | 9/1996 | Irie et al. | |
| 5,557,684 A | 9/1996 | Wang et al. | |
| 5,559,901 A | 9/1996 | Lobregt | |
| 5,562,788 A * | 10/1996 | Kitson et al. | 156/64 |
| 5,568,563 A | 10/1996 | Tanaka et al. | |
| 5,570,430 A | 10/1996 | Sheehan et al. | |
| 5,581,625 A | 12/1996 | Connell et al. | |
| 5,586,058 A | 12/1996 | Aloni et al. | |
| 5,602,937 A | 2/1997 | Bedrosian et al. | |
| 5,625,707 A | 4/1997 | Diep et al. | |
| 5,631,975 A | 5/1997 | Riglet et al. | |
| 5,633,951 A | 5/1997 | Moshfeghi | |
| 5,638,116 A | 6/1997 | Shimoura et al. | |
| 5,638,489 A | 6/1997 | Tsuboka | |
| 5,657,403 A | 8/1997 | Wolff et al. | |
| 5,673,334 A | 9/1997 | Nichani et al. | |
| 5,686,973 A | 11/1997 | Lee | |
| 5,694,482 A | 12/1997 | Maali et al. | |
| 5,694,487 A | 12/1997 | Lee | |
| 5,703,964 A | 12/1997 | Menon et al. | |
| 5,708,731 A | 1/1998 | Shmotori et al. | |
| 5,717,785 A | 2/1998 | Silver | |
| 5,717,834 A | 2/1998 | Werblin et al. | |
| 5,734,742 A | 3/1998 | Asaeda | |
| 5,751,831 A | 5/1998 | Ono | |
| 5,796,868 A | 8/1998 | Dutta-Choudhury et al. | |
| 5,802,220 A | 9/1998 | Black et al. | |
| 5,815,198 A | 9/1998 | Vachtsevanos et al. | |
| 5,822,742 A | 10/1998 | Alkon et al. | |
| 5,825,913 A | 10/1998 | Rostami et al. | |
| 5,825,922 A | 10/1998 | Pearson et al. | |
| 5,828,770 A | 10/1998 | Leis et al. | |
| 5,848,184 A | 12/1998 | Taylor et al. | |
| 5,850,466 A | 12/1998 | Schott et al. | |
| 5,852,669 A | 12/1998 | Eleftheriadis et al. | |
| 5,864,779 A | 1/1999 | Fujimoto | |
| 5,890,808 A | 4/1999 | Neff et al. | |
| 5,912,984 A | 6/1999 | Michael et al. | |
| 5,912,985 A | 6/1999 | Morimoto et al. | |
| 5,917,602 A | 6/1999 | Bonewitz et al. | |
| 5,917,733 A | 6/1999 | Bangham | |
| 5,926,568 A | 7/1999 | Chaney et al. | |
| 5,933,516 A | 8/1999 | Tu et al. | |
| 5,937,084 A | 8/1999 | Crabtree et al. | |
| 5,940,535 A | 8/1999 | Huang | |
| 5,943,432 A | 8/1999 | Gilmore et al. | |
| 5,943,442 A | 8/1999 | Tanaka | |
| 5,950,158 A | 9/1999 | Wang | |
| 5,960,097 A | 9/1999 | Pfeiffer et al. | |
| 5,982,475 A | 11/1999 | Bruning et al. | |
| 5,995,648 A | 11/1999 | Drisko et al. | |
| 6,021,220 A | 2/2000 | Anderholm | |
| 6,023,530 A | 2/2000 | Wilson | |
| 6,026,186 A | 2/2000 | Fan | |
| 6,026,359 A | 2/2000 | Yamaguchi et al. | |
| 6,046,764 A | 4/2000 | Kirby et al. | |
| 6,049,619 A | 4/2000 | Anandan et al. | |
| 6,052,489 A | 4/2000 | Sakaue | |
| 6,061,471 A | 5/2000 | Coleman et al. | |
| 6,064,958 A | 5/2000 | Takahashi et al. | |
| 6,070,160 A | 5/2000 | Geary et al. | |
| 6,072,494 A | 6/2000 | Nguyen | |
| 6,072,882 A | 6/2000 | White et al. | |
| 6,081,620 A | 6/2000 | Anderholm | |
| 6,084,631 A | 7/2000 | Tonkin et al. | |
| 6,115,052 A | 9/2000 | Freeman et al. | |
| 6,115,480 A | 9/2000 | Washizawa | |
| 6,122,399 A | 9/2000 | Moed | |
| 6,154,566 A | 11/2000 | Mine et al. | |
| 6,173,070 B1 | 1/2001 | Michael et al. | |
| 6,175,644 B1 | 1/2001 | Scola et al. | |
| 6,178,261 B1 | 1/2001 | Williams et al. | |
| 6,184,924 B1 | 2/2001 | Schneider et al. | |
| 6,215,892 B1 | 4/2001 | Douglass et al. | |
| 6,215,915 B1 | 4/2001 | Reyzin | |
| 6,272,244 B1 | 8/2001 | Takahashi et al. | |
| 6,272,245 B1 | 8/2001 | Lin | |
| 6,282,462 B1 | 8/2001 | Hopkins | |
| 6,285,787 B1 | 9/2001 | Kawachi et al. | |
| 6,301,610 B1 | 10/2001 | Ramser et al. | |
| 6,311,173 B1 | 10/2001 | Levin | |
| 6,324,299 B1 | 11/2001 | Sarachik et al. | |
| 6,333,993 B1 | 12/2001 | Sakamoto | |
| 6,346,966 B1 | 2/2002 | Toh | |
| 6,360,003 B1 | 3/2002 | Doi et al. | |
| 6,381,375 B1 | 4/2002 | Reyzin | |
| 6,396,517 B1 | 5/2002 | Beck et al. | |
| 6,396,949 B1 | 5/2002 | Nichani | |
| 6,424,734 B1 | 7/2002 | Roberts et al. | |
| 6,466,923 B1 | 10/2002 | Young et al. | |
| 6,483,935 B1 | 11/2002 | Rostami et al. | |
| 6,487,304 B1 | 11/2002 | Szeliski | |
| 6,525,810 B1 | 2/2003 | Kipman | |
| 6,526,156 B1 | 2/2003 | Black et al. | |
| 6,529,852 B2 | 3/2003 | Knoll et al. | |
| 6,539,107 B1 | 3/2003 | Michael et al. | |
| 6,545,705 B1 | 4/2003 | Sigel et al. | |
| 6,549,647 B1 | 4/2003 | Skunes et al. | |
| 6,580,810 B1 | 6/2003 | Yang et al. | |
| 6,587,122 B1 | 7/2003 | King et al. | |
| 6,597,381 B1 | 7/2003 | Eskridge et al. | |
| 6,608,930 B1 | 8/2003 | Agnihotri et al. | |
| 6,621,571 B1 | 9/2003 | Maeda et al. | |
| 6,628,805 B1 | 9/2003 | Hansen et al. | |
| 6,658,145 B1 | 12/2003 | Silver et al. | |
| 6,668,075 B1 | 12/2003 | Nakamura | |
| 6,691,126 B1 | 2/2004 | Syeda-Mahmood | |
| 6,741,977 B1 | 5/2004 | Nagaya et al. | |
| 6,774,917 B1 | 8/2004 | Foote et al. | |
| 6,850,646 B1 | 2/2005 | Silver | |
| 6,856,698 B1 | 2/2005 | Silver et al. | |
| 6,859,548 B2 | 2/2005 | Yoshioka et al. | |
| 6,944,584 B1 | 9/2005 | Tenney et al. | |
| 6,947,151 B2 * | 9/2005 | Fujii et al. | 356/612 |

| | | |
|---|---|---|
| 6,973,207 B1 | 12/2005 | Akopyan et al. |
| 6,973,209 B2 | 12/2005 | Tanaka |
| 6,987,528 B1 | 1/2006 | Nagahisa et al. |
| 6,997,556 B2 | 2/2006 | Pfleger |
| 6,999,625 B1 | 2/2006 | Nelson et al. |
| 7,016,539 B1 | 3/2006 | Silver et al. |
| 7,062,071 B2 | 6/2006 | Tsujino et al. |
| 7,085,401 B2 | 8/2006 | Averbuch et al. |
| 7,088,387 B1 | 8/2006 | Freeman et al. |
| 7,088,846 B2 | 8/2006 | Han et al. |
| 7,190,834 B2 | 3/2007 | Davis |
| 7,239,929 B2 | 7/2007 | Ulrich et al. |
| 7,773,801 B2 | 8/2010 | Kanda |
| 2002/0005895 A1 | 1/2002 | Freeman et al. |
| 2002/0054699 A1 | 5/2002 | Roesch et al. |
| 2002/0099455 A1 | 7/2002 | Ward |
| 2002/0109112 A1* | 8/2002 | Guha et al. ............... 250/559.46 |
| 2002/0122582 A1 | 9/2002 | Masuda et al. |
| 2002/0177918 A1 | 11/2002 | Pierel et al. |
| 2002/0181405 A1 | 12/2002 | Ying |
| 2003/0113018 A1 | 6/2003 | Nefian et al. |
| 2003/0120714 A1 | 6/2003 | Wolff et al. |
| 2003/0137590 A1 | 7/2003 | Barnes et al. |
| 2003/0197698 A1* | 10/2003 | Perry et al. ..................... 345/419 |
| 2003/0219146 A1 | 11/2003 | Jepson et al. |
| 2003/0227483 A1 | 12/2003 | Schultz et al. |
| 2004/0148057 A1 | 7/2004 | Breed et al. |
| 2004/0201669 A1* | 10/2004 | Guha et al. .................... 348/126 |
| 2004/0218806 A1 | 11/2004 | Miyamoto et al. |
| 2005/0117801 A1 | 6/2005 | Davis et al. |
| 2005/0275831 A1 | 12/2005 | Silver |
| 2005/0276445 A1 | 12/2005 | Silver et al. |
| 2005/0276459 A1 | 12/2005 | Eames et al. |
| 2006/0043303 A1* | 3/2006 | Safai et al. .................... 250/347 |
| 2006/0056732 A1* | 3/2006 | Holmes ......................... 382/286 |
| 2006/0146377 A1 | 7/2006 | Marshall et al. |
| 2006/0223628 A1 | 10/2006 | Walker et al. |
| 2007/0009152 A1 | 1/2007 | Kanda |
| 2007/0146491 A1 | 6/2007 | Tremblay et al. |
| 2008/0166015 A1 | 7/2008 | Haering et al. |
| 2008/0167890 A1 | 7/2008 | Pannese et al. |
| 2008/0285802 A1 | 11/2008 | Bramblet et al. |
| 2009/0121027 A1 | 5/2009 | Nadabar |

FOREIGN PATENT DOCUMENTS

| | | |
|---|---|---|
| DE | 10040563 | 2/2002 |
| GB | 2226130 | 6/1990 |
| GB | 2309078 | 7/1997 |
| JP | 6378009 | 4/1988 |
| JP | 9-288060 | 11/1997 |
| JP | 11-101689 | 4/1999 |
| JP | 2000-84495 | 3/2000 |
| JP | 2000-293694 | 10/2000 |
| JP | 2000-322450 | 11/2000 |
| JP | 2001-109884 | 4/2001 |
| JP | 2001-194323 | 7/2001 |
| JP | 2002-148205 | 5/2002 |
| JP | 3598651 | 12/2004 |

OTHER PUBLICATIONS

"ADSP-BF533 Blackfin Processor Hardware Reference", Analog Devices Inc.—Media Platforms and Services Group, Preliminary Revision—Part No. 82-002005-01, (Mar. 2003).

"Apex Model Object", Cognex Corporation, acuWin version 1.5,(1997),pp. 1-17.

"Apex Search Object Library Functions", Cognex Corporation, (1998).

"Apex Search Object", acuWin version 1.5, (1997), pp. 1-35.

"Bi-i", AnaLogic Computers Ltd., (2003).

"Bi-i: Bio-inspired Real-Time Very High Speed Image Processing Systems", AnaLogic Computers Ltd., http://www.analogic-computers.com/cgi-bin/phprint21.php, (2004).

"Blackfin Processor Instruction Set Reference", Analog Devices, Inc., Revision 2.0, Part No. 82-000410-14, (May 2003).

"CCD/CMOS Sensors Spot Niche Application", PennWell Corporation, Vision System Design—Imaging and Machine Vision Technology, (2004).

"Cellular device processes at ultrafast speeds", VisionSystems Design, (Feb. 2003).

"Cognex 2000/3000/4000 Vision Tools", Cognex Corporation, Chapter 2 Searching Revision 5.2 P/N 590-0103,(1992), pp. 1-68.

"Cognex 3000/4000/5000 Image Processing", Revision 7.4 590-0135 Edge Detection Tool, (1996).

"Cognex 3000/4000/5000 Programmable Vision Engines, Vision Tools", Chapter 1 Searching, Revision 7.4 590-1036, (1996), pp. 1-68.

"Cognex 3000/4000/5000 Programmable Vision Engines, Vision Tools", Chapter 14 Golden Template Comparision, (1996), pp. 569-595.

"Cognex 4000/5000 SMD Placement Guidance Package, User's Manual", Release 3.8.00, Chapter 15, 590-6168, (1998).

"Cognex VisionPro", Getting Started—QuickStart Tutorial, Cognex Corporation, 590-6560, Revision 3.5,(May 2004), 69-94.

"CV-2100 Series", Keyence America http://www.keyence.com/products/vision/cv_2100_spec.html, High-Speed Digital Machine Vision System, (Dec. 29, 2003).

"CVL Vision Tools Guide", Cognex MVS-8000 Series, Chapter 5, Symbol Tool, CVL 5.4, (Dec. 1999).

"HawkEye 1515—Smart Camera Reader for Directly Marked Data Matrix Codes", RVSI 486 Amherst Street, Nashua, NH 03063, (2004).

"ICS 100—Intelligent Camera Sensor", SICK Product Information, SICK Industrial Sensors, 6900 West 110th Street, Minneapolis, MN 55438, www.sickusa.com, (Jan. 3, 2002).

"Laser Scanning Product Guide", Adaptive Optics Associates—Industrial Products and Systems, Industrial Holographic and Conventional Laser 1D, Omnidirectional Bar Codes Scanners, (Mar. 2003), 90 Coles Road, Blackwood, NJ 08012.

"LM9630 100 x 128, 580 fps UltraSensitive Monochrome CMOS Image Sensor", National Semiconductor Corp., www.national.com Rev. 1.0,(Jan. 2004).

"Matsushita Imagecheckers", NAiS Machine Vision—Matsushita Machine Vision Systems, (2003).

"Matsushita LightPix AE10", NAiS Machine Vision—Matsushita Machine Vision Systems, (2003).

"SmartCapture Tool", Feature Fact Sheet, Visionx Inc., www.visionxinc.com, (2003).

Asundi, A. et al., "High-Speed TDI Imaging for Peripheral Inspection", Proc. SPIE vol. 2423, Machine Vision Applications in Industrial Inspection III, Frederick Y. Wu; Stephen S. Wilson; Eds., (Mar. 1995),p. 189-194.

Avalon Vision Solutions, "If accuracy matters in your simplest vision applications Use the Validator", (2006).

Baillard, C. et al., "Automatic Reconstruction of Piecewise Planar Models from Multiple Views", CVPR, vol. 02, No. 2, (1999), 2559.

Ballard, D. H., et al., "Generalizing the Hough Transform to Detect Arbitrary Shapes", Pattern Recognition, vol., 13, No. 2 Pergamon Press Ltd. UK,(1981),pp. 111-122.

Ballard, et al., "Searching Near and Approximate Location", Section 4.2, Computer Vision, (1982), pp. 121-131.

Ballard, et al., "The Hough Method for Curve Detection", Section 4.3, Computer Vision, (1982),pp. 121-131.

Baumberg, A. M. et al., "Learning Flexible Models from Image Sequences", University of Leeds, School of Computer Studies, Research Report Series, Report 93.36, (Oct. 1993), pp. 1-13.

Baumer Optronic, "Technishche Daten", www.baumeroptronic.com, Product Brochure, (Apr. 2006).

Belongie, S. et al., "Shape Matching and Object Recognition Using Shape Contexts", IEEE Transactions on Pattern Analysis and Machine Intelligence, IEEE Inc. New York, vol. 24, No. 4, (Apr. 2003), 509-522.

Bileschi, S. et al., "Advances in Component-based Face Detection", Lecture notes in Computer Science, Springer Verlag, New York, NY, vol. 2388, (2002),135-143.

Bookstein, F L., "Principal Warps: Thin-Plate Splines and the Decomposition of Deformations", IEEE Transactions on pattern Analysis and Machine Intelligence, IEEE Inc., New York, vol. 11, No. 6,(Jun. 1, 1989).

Borgefors, Gunilla "Hierarchical Chamfer Matching: A Parametric Edge Matching Algorithm", IEEE Transaction on Pattern Analysis and Mchine Intelligence, vol. 10, No. 6, (Nov. 1988).

Brown, Lisa G., "A Survey of Image Registration Techniques", ACM Computing Surveys, vol. 24, No. 4 Association for Computing Machinery,(1992), pp. 325-376.

Caelli, et al., "Fast Edge-Only Matching Techniques for Robot Pattern Recognition", Computer Vision, Graphics and Image Processing 39, Academic Press, Inc., (1987), pp. 131-143.

Caelli, et al., "On the Minimum Number of Templates Required for Shift, Rotation and Size Invariant Pattern Recognition", Pattern Recognition, vol. 21, No. 3, Pergamon Press plc, (1988), pp. 205-216.

Chang, Dingding et al., "Feature Detection of Moving Images using a Hierarchical Relaxation Method", IEICE Trans. Inf. & Syst., vol. E79-D, (Jul. 7, 1996).

Chen, Y. H., "Computer Vision for General Purpose Visual Inspection: a Fuzzy Logic Approach", Optics and Lasers in Engineering 22, Elsevier Science Limited, vol. 22, No. 3, (1995), pp. 182-192.

Chew, et al., "Geometric Pattern Matching under Euclidean Motion", Computational Geometry, vol. 7, Issues 1-2, Jan. 1997, pp. 113-124, 1997 Published by Elsevier Science B.V.

Cognex Corporation, "Screen shot of the CheckMate GUI Ver 1.6", (Jan. 2005).

Cognex Corporation, "Sensorpart FA45 Vision Sensor", (Sep. 29, 2006).

Cognex Corporation, "VisionPro Getting Started", Revision 3.2, 590-6508, (2003).

Cootes, T. F., et al., "Active Shape Models—Their Training and Application", Computer Vision and Image Understanding, vol. 61, No. 1,(Jan. 1995),38-59.

Cordin Company, "Electronic Imaging Systems", High Speed Imaging Solutions: 200-500 Series Cameras, (Aug. 4, 2004).

Corke, Peter I., et al., "Real Time Industrial Machine Vision", Electrical Engineering Congress Sydney, Australia, CSIRO Division of Manufacturing Technology, (1994).

Cox, et al., "Predicting and Estimating the Accuracy of a Subpixel Registration Algorithm, IEEE Transactions on Pattern Analysis and Machine Intelligence", vol., 12, No. 8, (Aug. 1990), 721-734.

Crouzil, et al., "A New Correlation Criterion Based on Gradient Fields Similarity", Proceedings of the 13th International Conference on Pattern Recognition vol. I Track A, Computer Vision, (1996), pp. 632-636.

Demotte, Donald "Visual Line Tracking", Application Overview & Issues Machine Vision for Robot Guidance Workshop, (May 5, 2004).

Denis, Jolivet "LabVIEW and IMAQ Vision Builder Provide Automated Visual Test System", Semiconductor: IMAQ Advanced Analysis Toolkit, IMAQ Vision Builder—LabVIEW—National Instruments—XP002356529—URL http://www.ni.com/pdf/csma/us/JNDESWG.pdf, (2001).

Di Mauro, E. C., et al., "Check—a generic and specific industrial inspection tool", IEE Proc.-Vis. Image Signal Process., vol. 143, No. 4, (Aug. 27, 1996),pp. 241-249.

Feldmar, et al., "3D-2D Projective Registration of Free-Form Curves and Surfaces", Computer Vision and Image Understanding, vol. 65, No. 3, (Mar. 1997), 403-424.

Fitzpatrick, J M., et al., "Handbook of Medical Imaging", vol. 2: Medical image Processing and Analysis, SPIE Press, Bellingham, WA, (2000), 447-513.

Gdalyahu, Yoram et al., "Self-Organization in Vision: Stochastic Clustering for Image Segmentation, Perceptual Grouping, and Image Database Organization", IEEE Transactions on Pattern Analysis and Machine Intelligence, IEEE Inc., New York, US, vol. 23, No. 10, (Oct. 2001),1053-1074.

Geiger, et al., "Dynamic Programming for Detecting, Tracking, an Matching Deformable contours", IEEE, (1995), pp. 294-302.

Gennery, Donald B. "Visual Tracking of Known Three-Dimensional Objects", International Journal of Computer Vision, (1992), 243-270.

Grimson, et al., "On the Sensitivity of the Hough Transform for Object Recognition", IEEE Transactions on Pattern Analysis and Machine Intelligence, vol. 12. No. 3, (1990), pp. 255-274.

Haering, N. et al., "Visual Event Detection", Kluwer Academic Publishers, Chapter 2, Section 8, (2001).

Hsieh, et al., "Image Registration Using a New Edge-Based Approach", Computer Vision and Image Understanding, vol. 67, No. 2,(1997), pp. 112-130.

Hunt, Shane C., "Mastering Microsoft PhotoDraw 2000", SYBEX, Inc., San Francisco, (May 21, 1999), 400 p.

Huttenlocher, Daniel P., "Comparing Images using the Hausdorff Distance", IEEE Transactions on Pattern Analysis and Machine Intelligence, vol. 15, No. 9, (Sep. 1993).

IBM, "Software Controls for Automated Inspection Device Used to Check Interposer Buttons for Defects", IP.com Journal, IP.com Inc., West Henrietts, NY, US, (Mar. 27, 2003).

Integrated Design Tools, "High-Speed CMOS Digital Camera", X-Stream Vision User's Manual, (2000).

IO Industries, "High Speed Digital Video Recording Software 4.0", IO industries, Inc.—Ontario, CA, (2002).

Jain, et al., "Object Matching Using Deformable Templates", IEEE Transactions on Pattern Analysis and Machine Intelligence, vol. 18, No. 3, (Mar. 1996), 267-278.

Joseph, S. H., "Fast Optimal Pose Estimation for Matching in Two Dimensions", Image Processing and its Applications, Fifth International Conference, (1995).

Kahn, Phillip "Building blocks for computer vision systems", IEEE Expert, vol. 8, No. 6, XP002480004, (Dec. 6, 1993), 40-50.

Kim, Zuwhan et al., "Automatic Description of Complex Buildings with Multiple Images", IEEE 0-7695-0813-8-00, (2000),155-162.

Lavision GMBH, "High Speed CCD/CMOS Camera Systems", Overview of state-of-the-art High Speed Digital Camera Systems—UltraSpeedStar, www.lavision.de,(Sep. 24, 2004).

Lu, "Shape Registration Using Optimization for Mobile Robot Navigation", Department of Computer Science, University of Toronto, (1995), 1-163.

Marchand, Eric et al., "A 2D-3D model-based approach to real-time visual tracking", Image and Vision Computing vol. 19, Issue 13, (Nov. 2001), 94155.

Marsh, R et al., "The application of knowledge based vision to closed-loop control of the injection molding process", SPIE vol. 3164, Faculty of Engineering University of the West of England United Kingdon, (1997), 605-16.

Matrox, "Interactive Windows Imaging Software for Industrial and Scientific Applications", Inspector 4.0—Matrox Imaging, (Apr. 15, 2002).

Mehrotra, Rajiv et al., "Feature-Based Retrieval of Similar Shapes", Proceedings of the International Conference on Data Engineering, Vienna, IEEE Comp. Soc. Press, vol. Conf. 9, (Apr. 19, 1993),108-115.

National Instruments, "IMAQVision Builder Tutorial", IMAQ XP-002356530, http://www.ni.com/pdf/manuals/322228c.pdf, (Dec. 2000).

Ohm, Jens-Rainer "Digitale Bildcodierung", Springer Verlag, Berlin 217580, XP0002303066, Section 6.2 Bewegungschatzung, (1995).

Olympus Industrial, "Design Philosophy", i-speed, (2002), 4.

Olympus Industrial, "High Speed, High Quality Imaging Systems", i-speed Product Brochure—Publisher Olympus Industrial, (2002),16.

Pauwels, E. J., et al., "Finding Salient Regions in Images", Computer Vision and Image Understanding, Academic Press, San Diego, CA, US, vol. 75, No. 1-2, (Jul. 1999), 73-85.

Perkins, W.A. "Inspector: A Computer Vision System that learns to Inspect Parts", IEEE Transactions on Pattern Analysis and Machine Vision Intelligence, vol. PAMI-5, No. 6, (Nov. 1983).

PHOTRON USA, "FASTCAM PCI", (Sep. 24, 2004).

PHOTRON USA, "FASTCAM-X 1280 PCI", (Sep. 24, 2004).

PHOTRON USA, "Ultima 1024", (Sep. 24, 2004).

PHOTRON USA, "Ultima 512", (Sep. 24, 2004).

PHOTRON USA, "Ultima APX", (Sep. 24, 2004).

Rohr, K. "Incremental Recognition of Pedestrians from Image Sequences", CVPR93, (1993).

Rosenfeld, et al., "Coarse-Fine Template Matching", IEEE Transactions on Systems, Man, and Cybernetics, (1997), pp. 104-107.

RVSI, "Smart Camera Reader for Directly Marked Data Matrix Codes", HawkEye 1515 with GUI, (2004).

Shi, Jianbo et al., "Normalized Cuts and Image Segmentation", Computer Vision and Pattern Recognition, Proceedings, IEEE Computer Society Conference on San Juan, IEEE Comput. Soc., (Jun. 17, 1997), 731-737.

Shi, Jianbo et al., "Normalized Cuts and Image Segmentation", IEEE Transaction on Pattern Analysis and Machine Intelligence, vol. 22, No. 8, (Aug. 2000), 888-905.

Siemens AG, "Simatic Machine Vision", Simatic VS 100 Series, www.siemens.com/machine-vision, (Apr. 1, 2003).

Stauffer, Chris et al., "Tracking-Based Automatic Object Recognition", Artificial Intelligence Laboratory, Massachusetts Institute of Technology, Cambridge, MA http://www.ai.mit.edu, (2001), pp. 133-134.

Stemmer Imaging GMBH, "Going Multimedia with Common Vision Blox", Product News, www.stemmer-imaging.de, (Mar. 3, 2004).

Stockman, G et al., "Matching images to models for registration and object detection via clustering", IEEE Transaction of Pattern Analysis and Machine Intelligence, IEEE Inc., New York, vol. PAMI-4, No. 3, (1982).

Tian, et al., "Algorithms for Subpixel Registration", Computer Vision Graphics and Image Processing 35, Academic Press, Inc., (1986), pp. 220-233.

Uno, T. et al., "A Method of Real-Time Recognition of Moving Objects and its Application", Pattern Recognition; Pergamon Press, vol. 8, pp. 201-208, (1976), pp. 201-208.

Vietze, Oliver "Miniaturized Vision Sensors for Process Automation", (Jan. 2, 2005).

Wallack, Aaron S., "Robust Algorithms for Object Localization", International Journal of Computer Vision, (May 1998), 243-262.

Wei, Wen et al., "Recognition and Inspection of Two-Dimensional Industrial Parts Using Subpolygons", Pattern Recognition, Elsevier, Kidlington, GB, vol. 25, No. 12, (Dec. 1, 1992),1427-1434.

Wells, et al., "Statistical Object Recognition", Submitted to the Department of Electrical Engineering and Computer Science, (Nov. 24, 1992), 1-177.

West, Perry C., "High Speed, Real-Time Machine Vision", Imagenation and Automated Vision Systems, Inc., (2001).

Whelan, P. et al., "Machine Vision Algorithms in Java", Chapter 1—An Introduction to Machine Vision, Springer-Verlag, XP002480005,(2001).

Wilson, Andrew "CMOS/CCD sensors spot niche applications", Vision Systems Design, (Jun. 2003).

Wright, Anne et al., "Cognachrome Vision System User's Guide", Newton Research Labs, Manual Edition 2.0, Documents Software Version 26.0,(Jun. 3, 1996).

Xie, Xuanli L., et al., "A New Fuzzy Clustering Validity Criterion and its Application to Color Image Segmentation", Proceedings of the International Symposium on Intelligent Control, New York, IEEE, (Aug. 13, 1991), 463-468.

Zarandy, A. et al., "Vision Systems Based on the 128X128 Focal Plane Cellular Visual Microprocessor Chips", IEEE, (Mar. 2003), III-518 -III-521.

Zarandy, Akos et al., "Ultra-High Frame Rate Focal Plane Image Sensor and Processor", IEEE Sensors Journal, vol. 2, No. 6, (2002).

Zhang, et al., "Iterative Point Matching for Registration of Free-Form Curves", (2004),1-42.

Zhang, Zhengyou "Parameter estimation techniques: A tutorial with application to conic fitting", Imag Vision Comput; Image and Vision computing; Elsevier Science Ltd, Oxford England, vol. 15, No. 1, (Jan. 1, 1997).

Scanlon, James et al., "Graph-Theoretic Algorithms for Image Segmentation", Circuits and Systems, ISCAS '99 Proceedings of the 1999 IEEE International Symposium on Orlando, FL, IEEE, (May 30, 1999),141-144.

KSV Instruments Ltd., "HiSIS 2002—High Speed Imaging System", www.ksvltd.fi, (Sep. 24, 2004).

"Description of Sobel Search", Cognex Corporation, (1998).

* cited by examiner

SYSTEM AND METHOD FOR DETECTING FLAWS IN OBJECTS USING MACHINE VISION

FIELD OF THE INVENTION

This invention relates to machine vision systems and methods, and more particularly to systems and methods for detecting flaws on parts and surfaces based upon trained images.

BACKGROUND OF THE INVENTION

Machine vision is used commonly to inspect manufactured objects, parts, printing and other physical items for visible flaws and defects. A variety of systems have been developed to perform such inspection, many of which contain a variety of advanced flaw-detection features and tools. One advanced inspection system is available under the Insight® product line from Cognex Corporation of Natick, Mass. Such systems can be trained with a model image of a desired part appearance, and employ advanced pattern recognition tools to compare the stored model image to the runtime image being inspected.

Two advanced software application are sold under the names PatMax® and Intellect®, and are also available from Cognex Corporation. This application uses advanced techniques to register a runtime image with respect to the trained image (if possible) even if the viewing angle is skewed, the part is rotated and the scale differs with respect to the training image. PatMax®, Intellect®, and other competing software applications, also allow the user to employ a variety of tools to aid in edge detection and other image-analysis processes.

One drawback with existing inspection tools is that it is often difficult for such tools to differentiate between acceptable process variations between parts and actual flaws in those parts that may render them defective or otherwise unacceptable. For example, most parts may contain indicia or markings that need not be very accurately placed, but which are nonetheless required. Likewise, certain non-critical surfaces may contain molding defects, or mouse bites. The user may be motivated to lower the overall sensitivity of the system so that it affords greater leeway to the placement and appearance of such markings or minor imperfections. However, simply detuning the detection criteria (i.e. lowering the system's sensitivity) may cause the system to miss critical flaws or defects, such as cracks in ear teeth, etc.

In addition, there are other reasons that a runtime image of an object may not match that of the trained images, these can include differences in scale, angle of view and illumination between the trained and runtime image. Some of these translate into perspective distortion, registration errors and non-rigid transformation of object features. While current machine vision tools can accommodate some of these differences, others may lead to false detection of flaws. For example, a hole viewed at an angle may reveal part of the inner wall of the hole, rendering the resulting appearance of the hole as an out-of-round, or off-center.

Accordingly, it is desirable to provide a mechanism by which the user can flexibly inspect for flaws on objects that allows differentiation between non-critical process variations or other runtime versus training image differences and critical flaws or defects.

SUMMARY OF THE INVENTION

This invention overcomes the disadvantages of the prior art by providing a system and method for flexibly detecting flaws in the acquired runtime/live images of objects based upon an inspection process that employs a training or model image of the object. This system and method enables predetermined flaws, and other predetermined features, within predetermined tolerances, to be disregarded as a flaw at inspection time, which affords greater flexibility in the inspection of objects that may have degrees of allowable variability on their surface features.

In an illustrative embodiment a system and for flexibly detecting flaws in an object includes an imaging device having a processor that performs a global registration of a model image with respect to a runtime image. A flexible flaw detection and local repositioning procedure within the processor is employed, which identifies a displacement of predetermined image features in the model image with respect to the runtime image, and computes a relative displacement therebetween. As such, local positioning of predetermined image features on the model image can be transformed with respect to the runtime image. An inspection procedure then performs inspection of the runtime image using the model image subsequent to the transformation of the predetermined image feature to allow for the selective disregarding of flaws that are not considered significant.

In an illustrative embodiment the detection and repositioning procedure is constructed and arranged to connect model image edge points to derive model edge segments and to connect runtime image edge points to derive runtime edge segments and to match the model edge segments with corresponding of the runtime edge segments, and to compute displacement between an enclosed segment feature in the model image and an enclosed segment feature in the runtime image. The procedure also computes respective displacements between pixels on a model image edge and pixels on a runtime image edge. A location transformation procedure is used, which for each model image pixel, employs the displacements of nearby model edge pixels to determine a displacement thereof with respect to a corresponding runtime image pixel. This location adjustment transformation procedure can be constructed and arranged to divide the model image and the runtime image, respectively, into bins and to average the displacements within each of the bins. Additionally, In an illustrative embodiment, the inspection procedure can be and area-based procedure, an edge-based procedure, or both types (among other inspection techniques).

BRIEF DESCRIPTION OF THE DRAWINGS

The invention description below refers to the accompanying drawings, of which.

DETAILED DESCRIPTION

Figure 1:
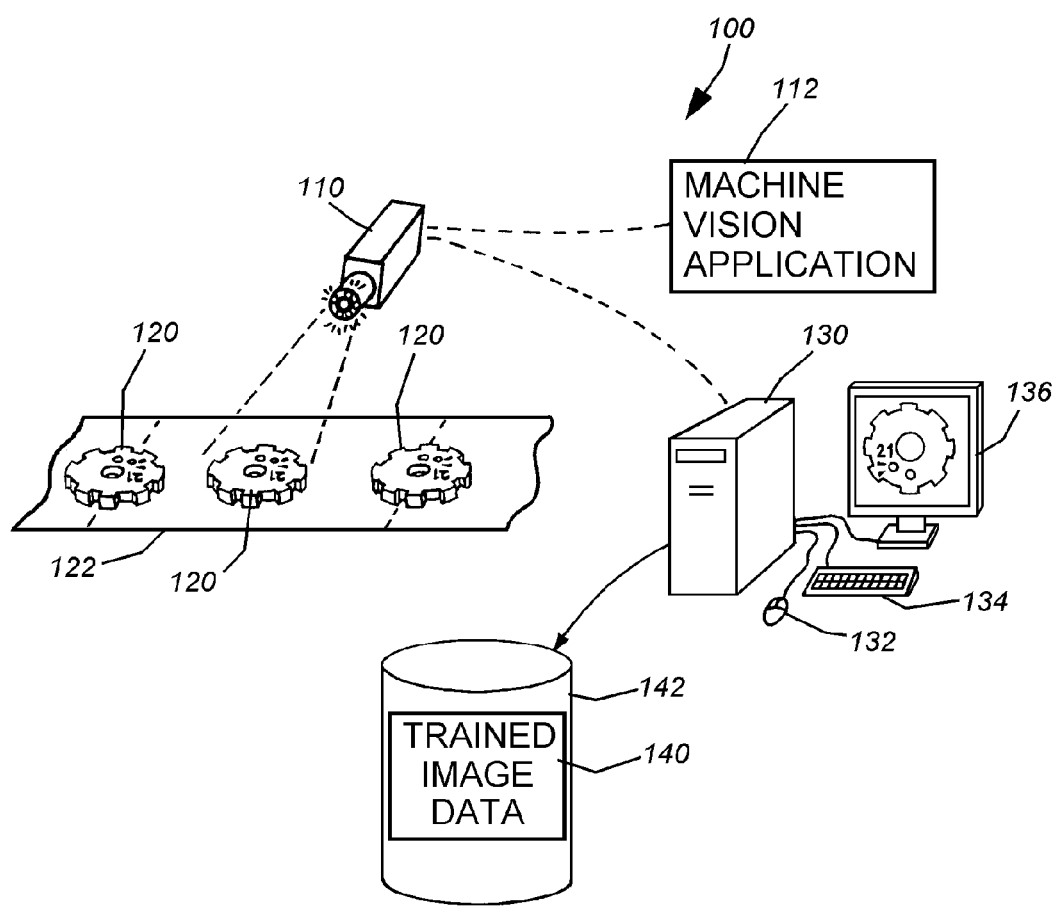
FIG. 1 is an exemplary machine vision system implementing a machine vision application which carries out the flexible flaw detection procedures according to an illustrative embodiment of this invention.

FIG. 1 details an exemplary machine vision system arrangement 100, which be employed in connection with the principles of this invention. It should be noted that a variety of system implementations can be employed in alternate embodiments. For example, a machine vision detector system in accordance with commonly assigned, copending U.S. Published Patent Application No. US200550275831A1, entitled METHOD AND APPARATUS FOR VISUAL DETECTION AND INSPECTION OF OBJECTS, by William M. Silver (the teachings of which are expressly incorporated by reference), can be employed in an alternate embodiment. As will be described in further detail below, the flexible flaw detection principles and procedures described herein are generally employed subsequent to the global positioning/registration of a live or runtime object image relative to a model or training image of the object, and prior to inspection of the runtime object or feature.

Referring to FIG. 1, the machine vision system 100 consists of an imaging device 110, which can be a camera that includes an onboard processor (not shown) and a memory (not shown) capable of running a machine vision application 112. Appropriate interfaces, alarms, and signals can be installed in, or connected to, the camera/imaging device 110 so that it is able to respond to a sensed fault detected during the inspection of an underlying object 120. In this embodiment, a conveyor 122 containing a plurality of objects (120) is shown. These objects pass, in turn, within the predetermined field of view (FOV) of the imagining device 110, so that their runtime images can be acquired and inspected for flaws (and/or other features of interest) during an inspection process. As such, the imaging device 110 acquires at least one image of each observed object 120.

A conventional microcomputer 130, or another exemplary computing device, is shown. This computer 130 includes graphical user interface components, such as a mouse 132, keyboard 134 and display 136. Other types of interfaces can also be employed, such as a Personal Digital Assistant (PDA) in alternate embodiments. In some embodiments, the imaging device 110 can be connected full-time to the computer 130—particularly where the computer performs the image processing functions. Alternatively, the processor in imaging devices, such as those of the Insight® product line, typically allow for independent operation of the device free of interconnect with a remote computer. In this embodiment, the computer 130 is connected to, and/or communicates with, the imaging device 110 for device-setup, testing, and analysis of runtime operation. Data related to a model or training image 140 can be stored in connection with the computer 130 in disc storage 142, and is be stored in the onboard memory of the imaging device 110. This data can include the flexible flaw detection parameters employed according to an embodiment of this invention.

Figure 2:
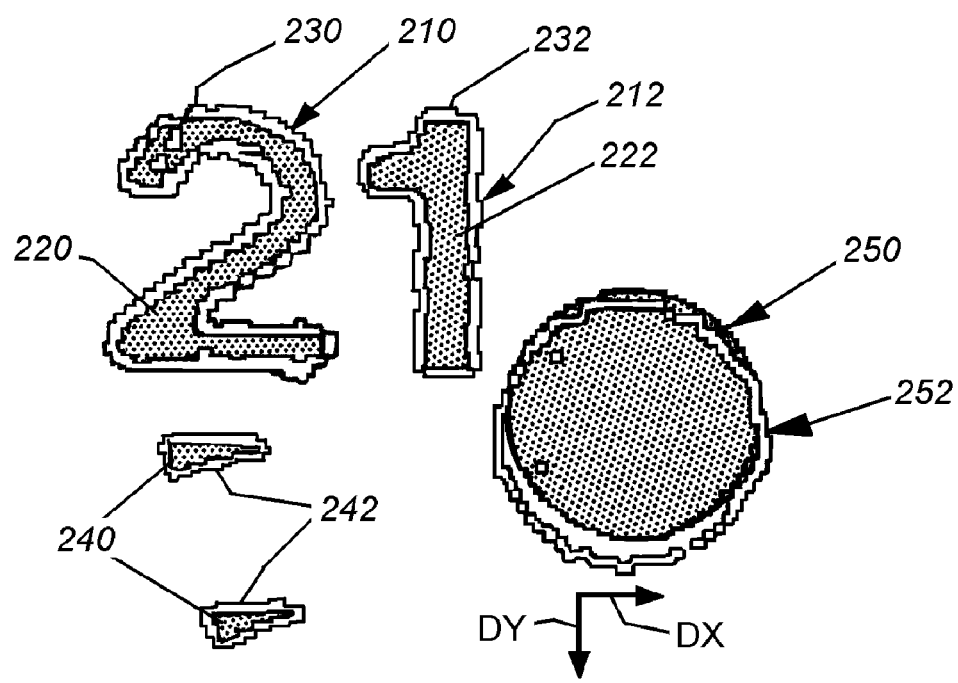
FIG. 2 is a diagram of an exemplary image showing a potential inspection flaw in an element that can be subjected to closed segment flexible flaw relocation procedures.

With reference to FIG. 2 and the above-recited background, it is common for certain features to exhibit slight misalignment, while still being within an acceptable range of tolerance. During a machine vision inspection process, an object is initially registered with respect to the training image in a global manner. That is, various edges and fiducials within the object are compared to those in a training image so that the object can be generally aligned with the edges of the training image using a rigid, affine transform procedure. This is accomplished using conventional machine vision search techniques available in, for example, the above-referenced PatMax® and/or Intellect®applications. Once a global registration has occurred, and the training pattern has been appropriately oriented and scaled with respect to the viewed runtime image. However, there may exist certain misalignments in elements of an object with respect to a model version—or other minor flaws that are not fatal to the part's quality. For example, the images for the applied numerals "2" 210 and "1" 212" are aligned so that their respective runtime images 220 and 222 fall substantially within the respective model image edges 230 and 232. Likewise, two smaller elements 240 are roughly aligned with the model image edges 242. However, there is also a hole or dot 250, which has been applied by a different machine or process. In this example, the hole 250 need not be very accurately placed with respect to the numerals (or other items in the overall image). In the example, the hole 250 is significantly misaligned with respect to the model edge 252. Thus, a conventional machine vision application would often flag this misalignment as a flaw in the part. However, the user may not consider this particular misalignment to be a flaw, and flagging it as such will slow the inspection process and waste resources. Thus, for various features where a certain degree of imperfection or positional variation is non-critical, it is desirable to subject these features to local flexible positioning prior to inspection.

Figure 3:
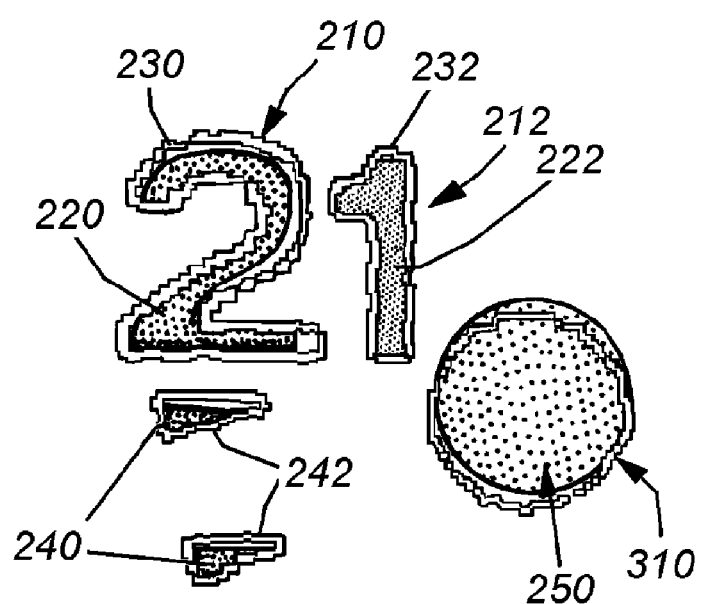
FIG. 3 is a diagram of the exemplary image of FIG. 2 showing the local relocation of the model image boundary to account for the closed segment flaw.

Referring to FIG. 3, a flexible positioning of the non-critically positioned hole 250 has been accomplished. The new training image 310 has been repositioned to be in alignment with the actual position of whole 250. While this result is representative generally of the flexible positioning procedures contemplated herein, this particular example represents a special case in which the elements undergoing repositioning are closed segment structures. That is, they can be surrounded by a training image edge that is continuous and unbroken, representing some type of polygon, numeral or other geometric shape (either simple or complex) having an enclosed boundary.

Figure 4:
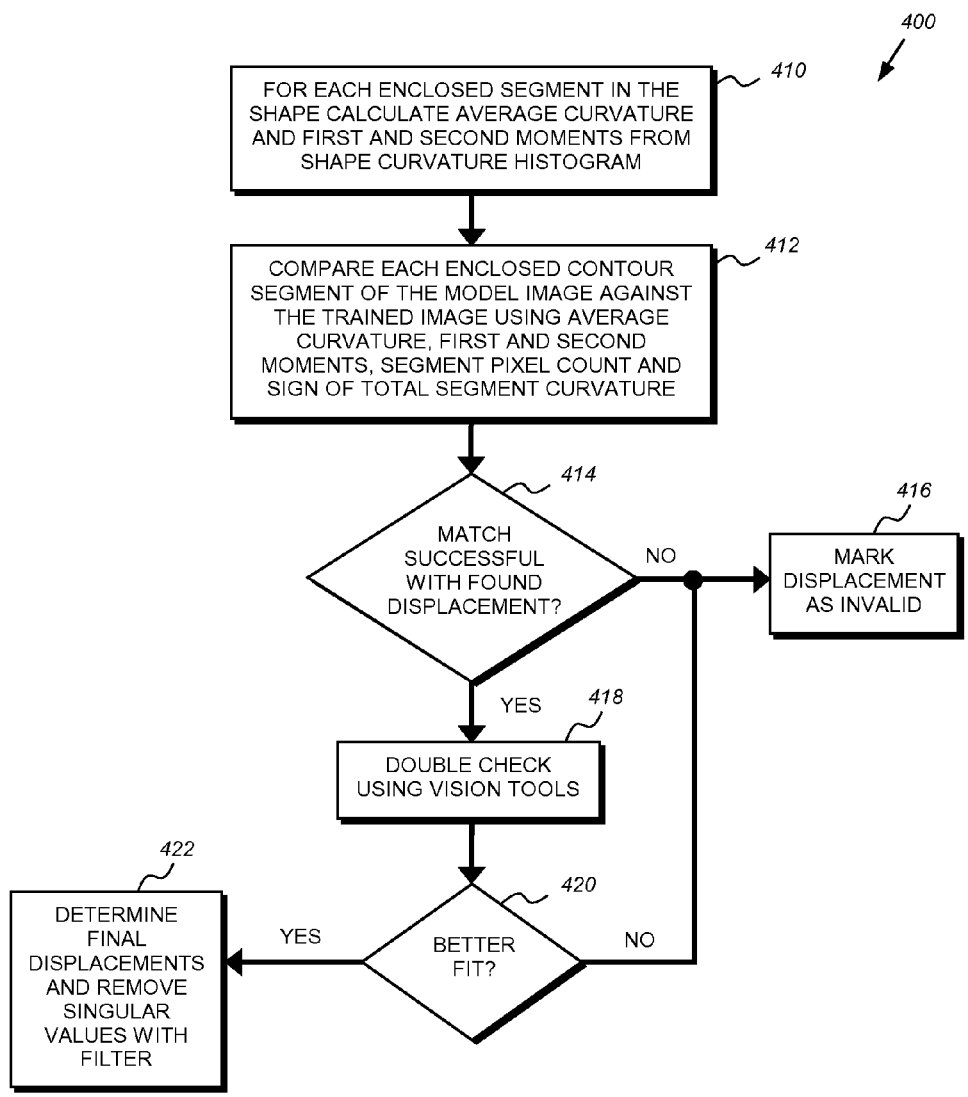
FIG. 4 is a flow diagram of a flexible flaw detection and relocation procedure for use on closed segment image elements.

Referring now to FIG. 4, a procedure 400 for performing flexible flaw detection of a closed segment shape is now described in further detail. After acquiring the runtime image of the object, the machine vision application (for example PatMax® or Intellect®) first performs a global positioning/registration of the model image with respect to the runtime image. This results in a rigid, affine transformation of the model image with respect to the runtime image. The machine vision application calculates a curvature histogram for the outline of each enclosed shape using an available curvature histogram (or similar) tool. The curvature histogram provides various parameters on individual segments of the enclosed shape, which are each interconnected to form the complete outline of that shape. A histogram for both the training or model image and the runtime image are provided. A segment is typically an element of the enclosed shape that includes a plurality of pixels thereby forming a curved or straight subset of the overall closed shape outline.

Given the curvature histogram, for each segment in the shape an average curvature is calculated as well as first and second moments of that segment (procedure step 410). The closed-segment flexible flaw detection procedure 400 then compares each enclosed contour segment of the model image against a trained image using the segment pixel count for each, the sign of the total segment curvature (e.g. toward which direction does the segment curve), and the average curvature, and the first and second moments (step 412). Given this comparison, the displacement along two orthogonal coordinates DX and DY (see FIG. 2) can be determined. If, using these displacement vectors (DX, DY), the comparison results in a match of the now-displaced training image outline versus the runtime image, then that match is considered successful (decision step 414). If the match is not successful, then these displacement vectors are marked as invalid, and the system will either try again with new displacement values (repeating the comparison steps 412 and 414, or indicate a flaw in the object that cannot be resolved by flexible flaw detection.

According to this embodiment, a successful comparison or match of model to runtime local positioning (via decision step 414) is double-checked using available tools within the vision application. A variety of vision tools can be used to determine whether the translated outline is successful. In Intellect®, one such tool is termed the Chamfer Distance tool with an angle checking function. Such tools generally rely upon measurement of distance between the translated training and runtime images and the relative angles of the translated segments. If, following the double-check step 418, the new local displacement for the segments allow the training outline to fit better on the live, runtime image (decision step 420), then this local translation is marked as a final value for the displacement vectors (DX, DY). At this time, the individual segment displacements derived from the comparison are placed through a filter and singular values are removed (step 422). If, however, a better fit is not achieved (decision step 420) after the double-check (step 418), then the closed-segment flaw detection procedure 400 branches to step 416 in which this displacement value is marked as invalid.

Figure 5:
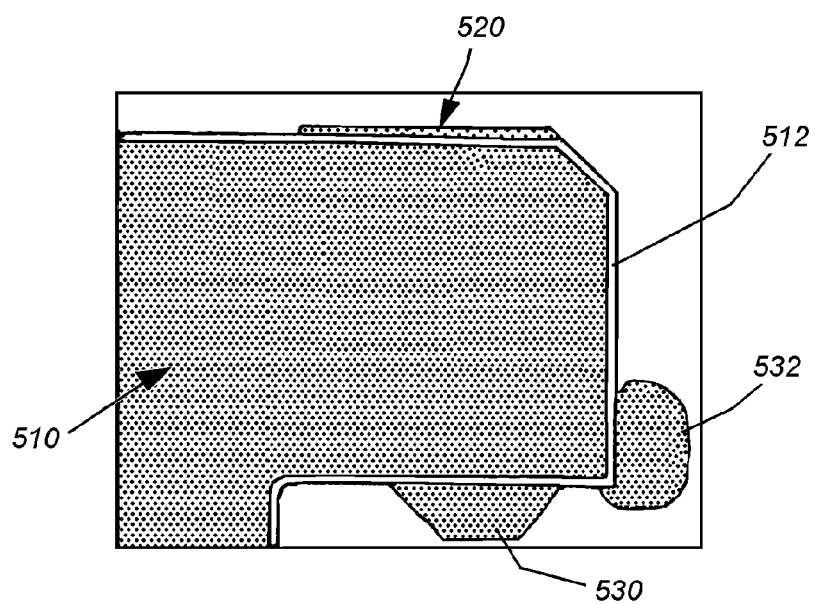
FIG. 5 is a diagram of an exemplary image showing a plurality of edge flaws including a flaw that is subject to flexible flaw relocation using an edge segment procedure and flaws that are outside the threshold for flexible flaw relocation.

The preceding example describes a local misalignment of an enclosed segment shape. As shown in FIG. 5, the flaw detection flexibility according to this invention can be employed on open segments such as that shown in FIG. 5. The image of FIG. 5 generally represents an underlying portion of a part 510 surrounded by a registered model or training image outline 512. The part includes an upper edge portion 520 representing a surface minor imperfection that deviates outside of the outline 512. In addition, the part includes a pair of substantial projections 530 and 532. For the purposes of this example, the upper edge deviation 520 is an acceptable surface imperfection, while the significant deviations 530 and 532 represent an unacceptable flaw.

Figure 6:
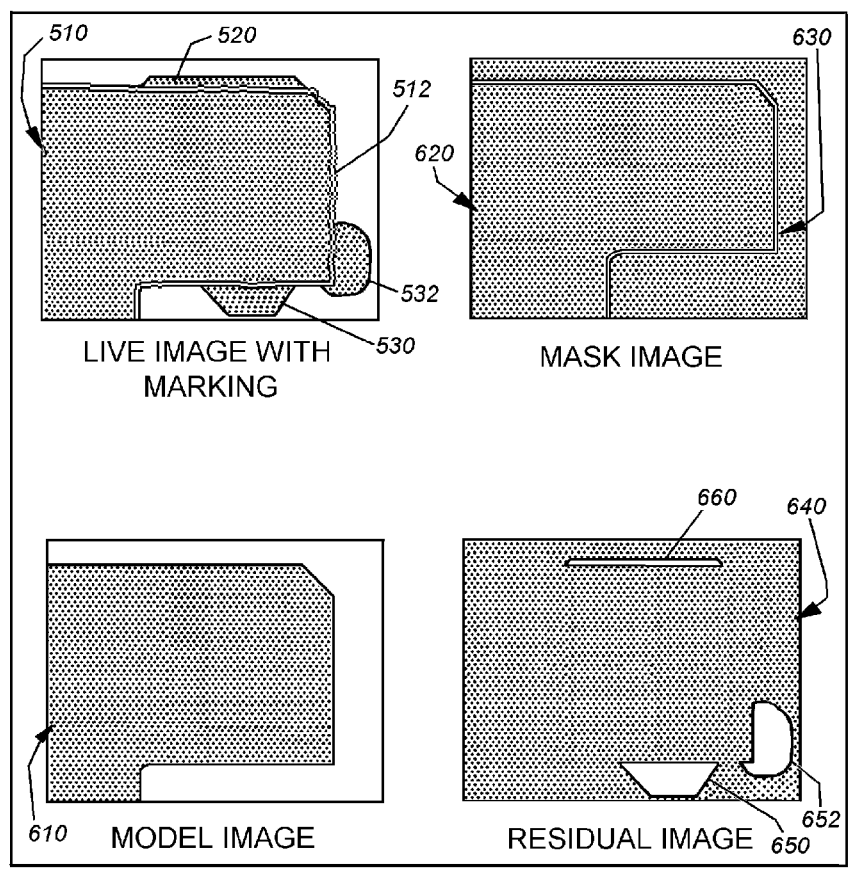
FIG. 6 is a diagram of a plurality of images representing exemplary inspection steps in connection with the image of FIG. 5 and without use of the illustrative edge segment flexible flaw detection and relocation procedures of this invention.

It should be noted that the interface for applying flexible flaw detection can include a variety of settings to deal with each a variety of possible flaws. Some potential flaws, such as edge surface imperfections that deviate from the model edge can be dealt-with by setting a predetermined tolerance. In this manner, the system will automatically decide if any deviation of the runtime edge from the model is sufficiently large to be considered a flaw. For example, the tolerance can be set so that deviations within a certain physical range or pixel width are considered non-flaws and will be automatically accommodated by flexible flaw detection. Alternatively, flaws, such as the misaligned whole 250 of FIG. 2 may require user intervention. For example, the user identifies this particular region of the training image as one that is subject to a certain degree of allowed displacement. The allowed displacement in each direction is then specified. A variety of available graphical user interface tools, which should be apparent to those of ordinary skill, can be employed to implement the needed flexible flaw settings and functions Referring further to the example of FIG. 5, the lower edge defects 530 and 532 are considered outside the tolerances of the flexible flaw detection settings (automatic or manual), and thus, will continue to register a flaw in the part 510. However, the upper surface imperfection 520 is within tolerance, and will be accommodated in accordance with the procedures described below. FIG. 6, by way of comparison, details a conventional approach to inspecting for flaws in an image using an area-based approach. Such an approach uses intensity or color variations to pick out and identify flaws. It is also contemplated that flaw detection procedures described herein can be employed with other inspection approaches, such as an edge-based inspection, in which the system scans for missing and/or extra edge segments within a given predetermined range. Flexible flaw detection according to this invention also works with a combination of inspection approaches. The runtime or live object image 510 of FIG. 5 is shown with the training image boundary 512 overlaid in the upper left frame of the figure. The top edge imperfection 520 and, more-significant, bottom edge defects 530 and 532 reside outside the model boundary. The model image 610 is shown in the bottom left frame of FIG. 6. This model image represents a nearly perfect part outline with all edges residing within desired tolerances. From this model image, a mask image 620 is created. The mask image includes an outline 630 that represents the boundary of the model image. In fact, the boundary 630 will appear as a dark area on the final image overlay. This overlay is shown as the residual image 640 in the bottom right frame of FIG. 6.

By way of background area inspection is based on image subtraction with masking capability. The mask image 620 is generated using a gradient filter at training time which aids in reducing false readings near the edges. The mask image is a grayscale or color image depending upon the type of imager employed (e.g. grayscale or color imager, respectively), rather than a binary image. The residual image is derived as follows: RESIDUAL IMAGE=Trunc(ABS(LIVE IMAGE−MODEL IMAGE)−MASK IMAGE), where Trunc( ) sets the value zero if it is negative. As such, this residual image is generally dark (or another grayscale/color image field shade), except for the recognized flaws, which extend outside the boundary 630, and which are a contrasting shade or color. These flaws include the two significant defects 650 and 652 as well as the minor surface imperfection at the top 660. Each of these defects, remaining in the residual image, can lead to an indication of flaw during inspection. Blob analysis tools can be employed to detect these flaws. Thus, the remaining top imperfection 660 is still a recognized flaw using a conventional global positioning and inspection, without flexible flaw detection. A similar result occurs using edge-based inspection. The top imperfection 520 will represent an extra line segment in inspection that indicates a flaw.

Figure 7:
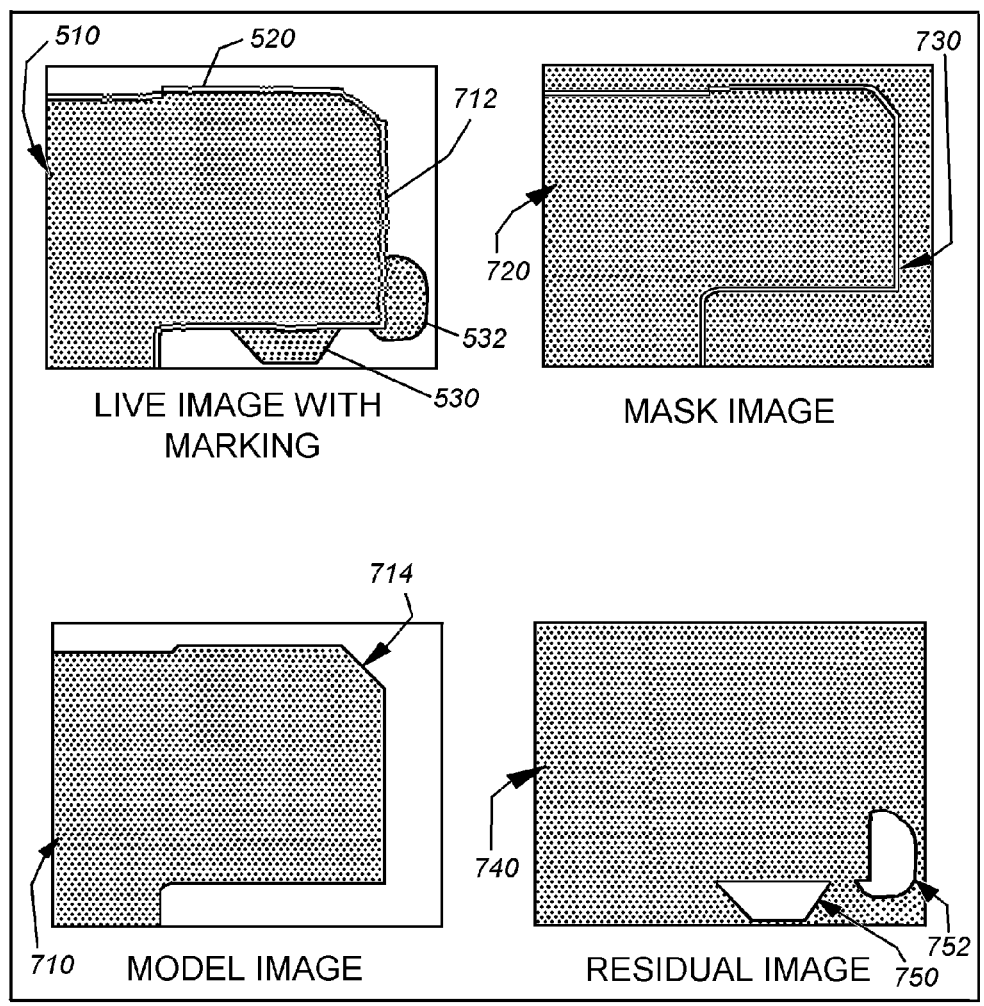
FIG. 7 is a diagram of a plurality of images representing exemplary inspection steps in connection with the image of FIG. 5 using the illustrative edge segment flexible flaw detection and relocation of this invention.

FIG. 7 indicates the results of area-based inspection using the flexible flaw detection procedures of this embodiment between runtime image acquisition and before inspection. The live or runtime image 510 includes imperfections 520, 530 and 532. However, in this embodiment, flexible flaw detection has allowed for additional tolerance with respect to the minor, top surface perfection 520. Thus, the resulting outline 712 of the model image with respect to the runtime image 510 is altered in the region of the top imperfection 520. Note that it has not been altered with respect to the more significant imperfections 530 and 532. Thus, these lower imperfections will still be indicated as flaws.

Thus, the resulting model image 710 in FIG. 7 includes a modified top outline 714. The resulting mask image 720 carries a similar outline 730. Thus, in the residual image 740, only the significant flaws 750 and 752 are visible and will be detectable via blob analysis or another inspection tool. As such, the minor surface imperfection has been eliminated as a flaw candidate by use of the illustrative flexible flaw detection procedures of this invention.

Figure 8:
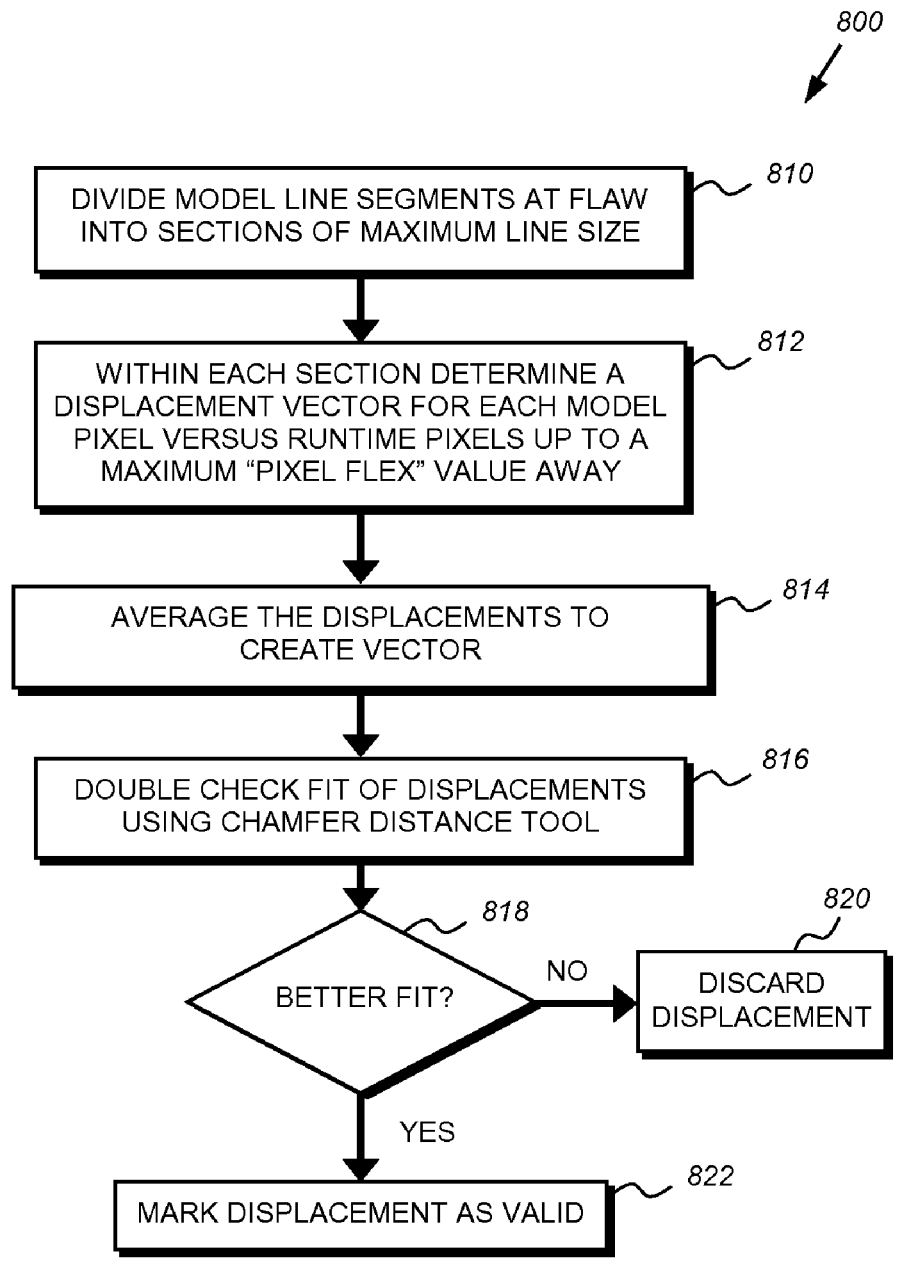
FIG. 8 is a flow diagram of a flexible flaw detection and relocation procedure for use on edge segments in an image according to an embodiment of this invention.
Figure 9:
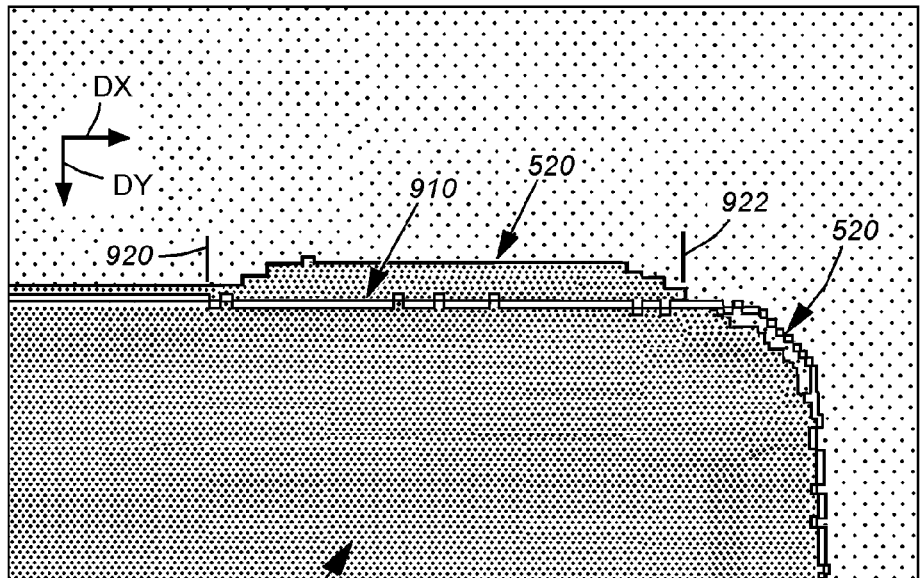
FIG. 9 is a more-detailed diagram of a portion of an image before application of the edge segment flexible flaw detection and relocation procedure of FIG. 8.
Figure 10:
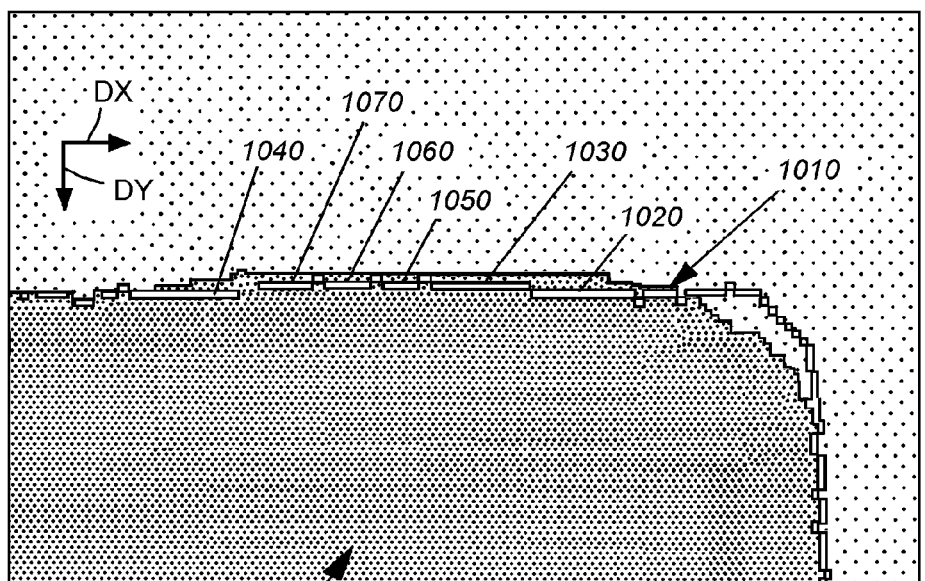
FIG. 10 is a more-detailed diagram of a portion of the image of FIG. 9 after application of the edge segment flexible flaw detection and relocation procedure of FIG. 8.

The illustrative procedure for allowing flexible, local positioning of line segments (along, for example, image boundary edges), such as those in the above-described surface imperfection 520 will now be described in further detail with reference to FIG. 8. The line segment flexible flaw detection procedure 800 is employed along portions of the runtime image boundary line which deviate from the registered model/training image. Reference is also made to FIGS. 9 and 10 which show the relevant training image boundary line 520 before and after (respectively) local repositioning by the procedure 800. As shown in FIG. 9, the line segment 910 between boundaries 920 and 922 is displaced from the actual edge of the surface imperfection 520. The relative location of pixels in the model image and corresponding runtime image has already been determined and the displacement therebetween has been calculated. The pixels in each are then connected into corresponding model and runtime line segments. Next, in procedure step 810, each model line segment is divided into sections having a maximum line size. In this example, the maximum line size is forty pixels (but any other size can be automatically or user-defined in alternate embodiments). Each section may have its own displacement relative to the runtime image edge. Within each section, the machine vision search routine attempts to determine a displacement vector for each edge pixel within that section (step 812) between the pixels in the model and those pixels in the corresponding runtime image. In the illustrative embodiment a machine vision search tool (the above-described Chamfer Distance tool, for example) is used to test the fit to define a distance D to the closest runtime edge pixel with respect to every model edge pixel. Because every pixel in the edge is fitted, the search space for each model edge pixel is just two pixels, D distance away along a perpendicular line on either side of that edge pixel. Given such short distances, the resulting procedure steps occur very quickly. However, in order to double-check the results, in the event that quick checking according to step 812 is unsuccessful, a second search space is employed. This search space still occurs along a perpendicular line from the edge, but checks every adjacent pixel to the respective edge pixel up to a maximum "Pixel Flex" distance value away (see also step 812). Using these two approaches, displacement vectors (DX and DY) can be derived. The resulting displacement of the model line segment 1010 is shown in FIG. 10.

Figure 12:
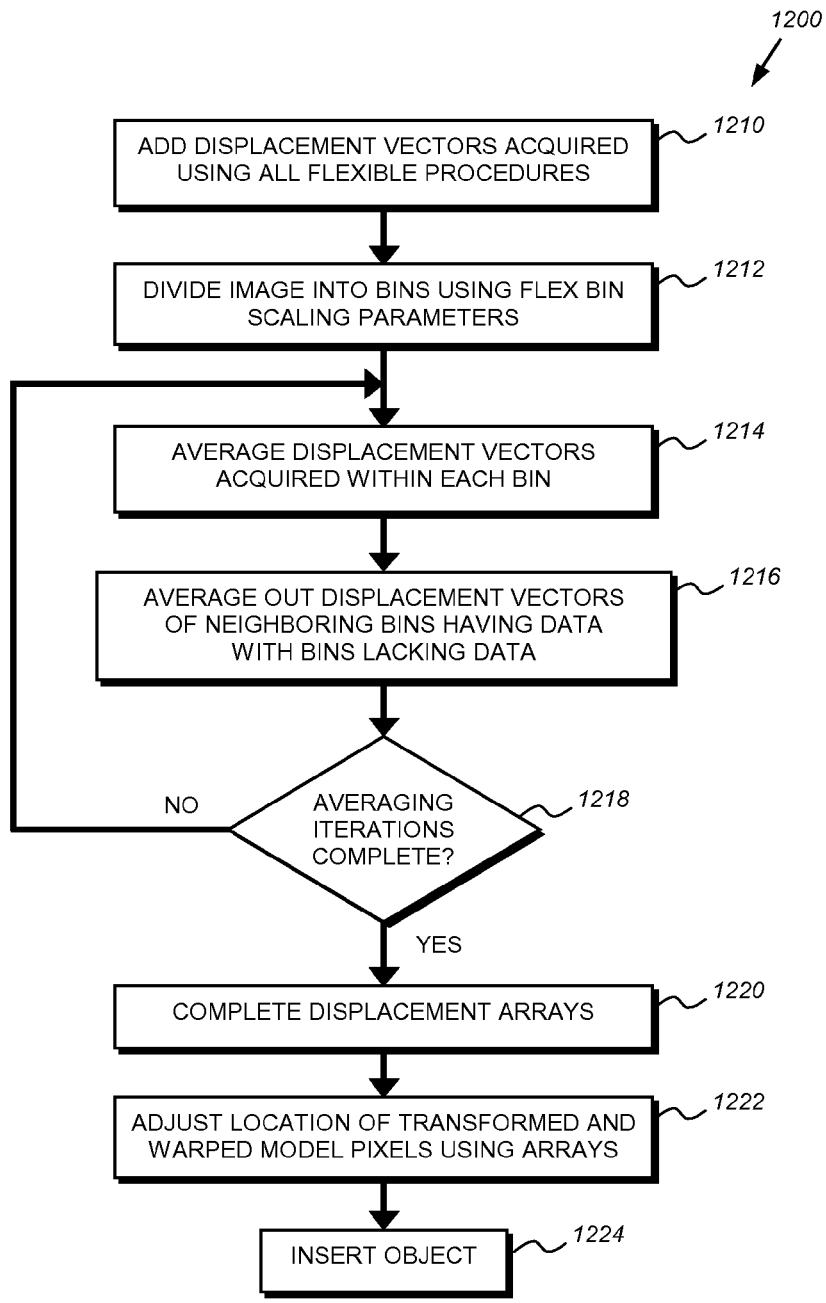
FIG. 12 is a flow diagram of a procedure for generating displacement arrays for all displacement vectors derived from each of the flexible flaw detection/relocating procedures.

It should be clear that when the procedure 800 acts upon vertical edges will only provide a DX displacement value while horizontal edges will provide only a DY displacement value. Non-vertical/non-horizontal edges will provide both a DX and DY displacement value. Where two orthogonal displacement vectors are involved, steps 812 and 814 are repeated for that section based upon the second of the orthogonal directions. The individual DX and DY displacements are then averaged in step 814 to create a displacement vector for the segment. The procedure 800 then double checks the fit of the segment in view of the calculated displacements in step 816. The check can occur using an appropriate fit tool in the machine vision system—for example the Chamfer Distance tool in Intellect®, or the relatively similar Object Locate tool in PatMax®. In decision step 818 it is determined whether the double checking step 816 has provided displacement vectors that, indeed, result in a better fit (based upon the determination of the tool) for the model edge segment relative to the runtime segment. If the fit is not better, then that displacement vector is discarded from the group of vectors (step 820). If, however a better fit is attained, then the displacement vector is marked as valid (step 822) and are stored as final values for the segment for use in the later adjustment procedure 1200 (FIG. 12 below). As will be described below, once all displacement vectors are calculated by the system, they are used to reposition, locally, the model image for inspection against the runtime image via the area-based and/or edge-based techniques (for example). So long as the repositioning of local features places these model features within a given threshold relative to the prevailing runtime image, they will be disregarded during inspection by conventional inspection tools and that flaw will be eliminated. Conversely, displacement vectors that cause repositioned features to fall outside the threshold will be identified as an actual flaw.

Figure 11:
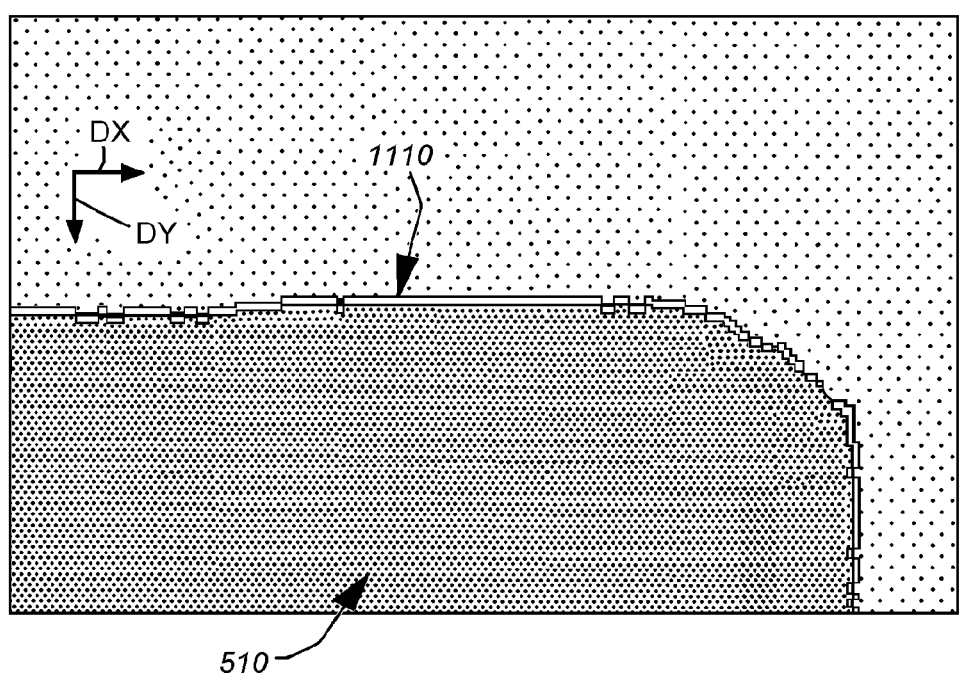
FIG. 11 is a more-detailed diagram generally of a portion of the image of FIG. 9 after application of an All Pixels flexible flaw detection and relocation procedure according to an embodiment of this invention.

The procedure 800, operating upon discrete sections of the line segment can be modified to operate on every model edge pixel as shown in FIG. 11. This can be termed the "All Pixels" procedure. As shown, the resulting line 1110 for the model is fitted to the boundary of the runtime image 510. In this embodiment, the search space is similar in range to that of the procedure 800. Each individual pixel can be provided with a DX and DY displacement, resulting in its own displacement vector. In other words, the All Pixels procedure is like the segments procedure 800 (FIG. 8), except that it omits the sections-division in step 810, and substitutes the term "pixels" for "sections" elsewhere to obtain a similar final result with flexible, localized relocation of the model edge. While the All Pixels procedure creates more data points, it also results in a high degree of accuracy in the translation of the model line position.

FIG. 12 details a procedure 1200, for performing the overall flexible flaw repositioning prior to inspection. In particular, after each of the flexible flaw detection procedures described above has completed on the image (e.g. enclosed segment, line segment and All Pixels), the respective displacement vectors DX and DY acquired using these procedures are accumulated (step 1210). The image is then divided into bins using a "Flex Bin" scaling routine (step 1212). Bins can be defined based on a variety of criteria. For example, bins can be based upon predetermined portions of the overall the area of image, wherein relatively equal areas are defined by each bin. In one embodiment, each bin defines a square area of a given size so that the overall image is divided by a regular grid into a series of adjacent squares. The size of the bin (i.e. the pixel-length of the sides of the square) is determined by the Flex Bin parameter. In alternate embodiments, bin sizes can be varied where more data may be contained in certain bins than in others. In alternate embodiments, bins can define a differing polygon shape, or an irregular shape that is particularly tailored to the shape of the imaged object. For example, a hexagonal object may use adjacent hexagonal bins (i.e. a honeycomb).

The displacement vectors DX, DY for data within each of the bins is then averaged (step 1214). Where bins do not have data, the displacement vectors of neighboring bins that have data is averaged out (step 1216). The filling and averaging of bins occurs over several iterations. When interactions are complete (decision step 1218) the construction of displacement arrays is thus complete (step 1220). At this time, the location of the transformed (and warped) model pixels is adjusted using the completed arrays (step 1222). Again, the transformation of local pixels occurs after any rigid affine transform of the model image with respect to the runtime image. Once the local transformation is complete, the object is ready for inspection according to conventional inspection techniques (step 1224).

Figure 13:
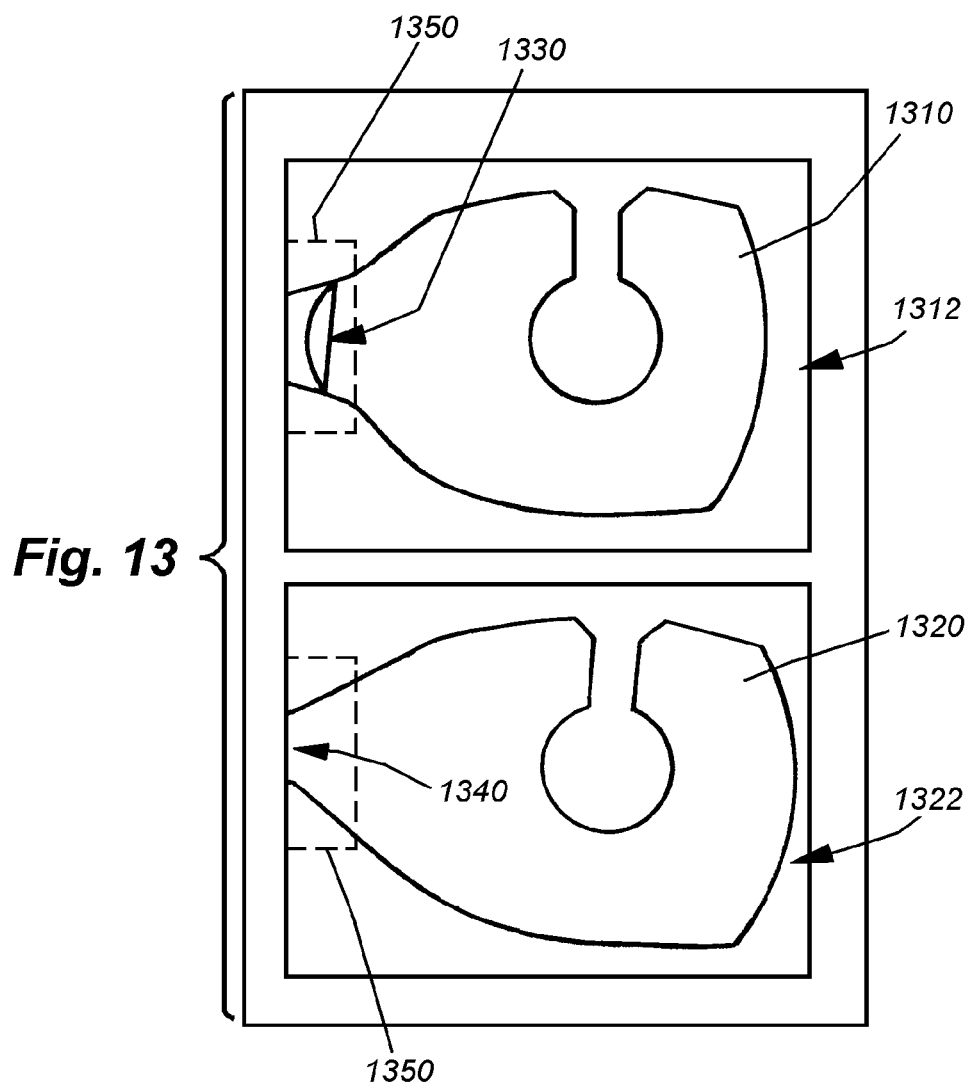
FIG. 13 is an example of a pair of similar objects in which particular differences can be filtered-out during inspection using flexible flaw detection and repositioning procedures according to an embodiment of this invention.

It should be noted that the flexible flaw detection and relocation procedures of this invention can be employed on objects that do not contain particular flaws requiring flexible flaw detection, due to the relatively low processing overhead of the procedure. Thus flexible flaw detection can be a regular default process within the machine vision system. Likewise, flexible flaw detection in accordance with this invention can be employed for objects that are substantially similar, but have known, purposeful variations. For example, FIG. 13 shows two parts 1310 and 1320, which are acquired in separate images 1312 and 1322. The upper part 1310 includes a raised structure 1330 on its step while the lower parts stem 1340 is structure-free. By setting the appropriate location parameters for the flexible element of the part, as represented by the dashed line box 1350, the stem can contain either a raised or unraised portion without triggering an inspection flaw. In other words, a model image can be made to fit either type of stem.

In conclusion, in the above-described invention, flexible flaw detection and repositioning of the model image occurs locally with respect to predetermined flaws and imperfections, and is undertaken after the image is acquired and the model image has undergone a global affine transformation/positioning with respect to the runtime image. Subsequent inspection then occurs with a locally repositioned model image that subsumes any imperfection or variation that is to be disregarded. The illustrative flexible flaw detection and repositioning procedure acts upon enclosed segment shapes (polygons, circles, etc.). The procedure relocates a model image feature containing a recognized enclosed segment shape so that it is locally registered with the runtime shape. Appropriate displacement vectors for the repositioning are determined where an irregularity occurs along an edge of the runtime image, with respect to the training image, a line segment procedure determines the displacement of predetermined line segments in the model image with respect to those in the runtime image. So long as the displacement is within a given tolerance, the model image segments are displaced to overlie the runtime image. Thus, when inspection occurs, the model edge appears to be in line with the slightly irregular runtime edge. An All Pixels procedure also acts upon edge pixels in the model image and runtime image, determining relative displacements therebetween. Individual pixels in the corresponding model image are repositioned by appropriate amounts so as to overly the runtime image during inspection. When each class of repositioning procedure has been completed, the displacement vectors derived therefrom are all acquired, and placed into bins that represent portions of the overall image. Displacement vectors are processed in these bins and the final, locally repositioned model image is thereby derived by averaging the displacement vectors in bins. This locally repositioned model image is used in the subsequent inspection process. The inspection process can employ a variety of techniques including area-based, edge-based, and a combination of area and edge-based inspection.

In the illustrative embodiment, the flexible flaw detection and local repositioning procedures herein can be used to enable certain purposefully provided features of an object to be overlooked so that objects having inherent variation (for example different models or types of parts in which a given feature differs therebetween) can be accommodated while still allowing comprehensive, high-tolerance inspection of portions of both types of part that are similar. The procedures herein can be employed generally as a default part of an overall machine vision process, even where no particular flaws in an object are expected. The tolerances by which flaws are overlooked or indicated can be user-defined or automatically set.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the flexible flaw detection procedures described herein can be used to afford flexibility to a range of colors, using settings that afford a range of color variation to an image and employ appropriate filters to generate a mask image (in area-based inspection, for example). Furthermore, other inspection techniques can be employed in connection with this invention. Also, it is expressly contemplated that the procedures described herein can be implemented in hardware, software, including a computer-readable medium having program instructions, or a combination of hardware and software. Accordingly, this description is meant to be taken only by way of example, and not to otherwise limit the scope of this invention.

What is claimed is:

1. A system for flexibly detecting flaws in an object comprising:
    an imaging device having a processor that performs a global registration of a model image with respect to a runtime image;
    a flexible flaw detection and repositioning procedure within the processor that identifies a displacement of predetermined image features in the model image with respect to the runtime image and that computes a relative displacement therebetween so that local positioning of predetermined image features on the model image can be transformed with respect to the runtime image to determine if the relative displacement results in a better fit for the model image relative to the runtime image and, if not, the relative displacement is marked invalid; and
    an inspection procedure that performs inspection of the runtime image using the model image subsequent to the transformation of the predetermined image features.

2. The system as set forth in claim 1 wherein the flexible flaw detection and repositioning procedure is constructed and arranged to connect model image edge points to derive model edge segments and to connect runtime image edge points to derive runtime edge segments and to match the model edge segments with corresponding of the runtime edge segments.

3. The system as set forth in claim 2 wherein the flexible flaw detection and repositioning procedure is constructed and arranged to compute displacement between an enclosed segment feature in the model image and an enclosed segment feature in the runtime image.

4. The system as set forth in claim 3 wherein the flexible flaw detection and repositioning procedure is constructed and arranged to compute respective displacements between pixels on a model image edge and pixels on a runtime image edge.

5. The system as set forth in claim 4 further comprising, a location transformation procedure that, for each model image pixel employs the displacements of nearby model edge pixels to determine a displacement thereof with respect to a corresponding runtime image pixel.

6. The system and set forth in claim 5 wherein the location adjustment transformation procedure is constructed and arranged to divide the model image and the runtime image, respectively, into bins and to average the displacements within each of the bins.

7. The system as set forth in claim 6 wherein the inspection procedure comprises at least one of area-based inspection and edge-segment based inspection.

8. The system as set forth in claim 1 wherein the inspection procedure comprises at least one of area-based inspection and edge-segment based inspection.

9. A method for flexibly detecting flaws in an object comprising the steps of:
  implementing one or more processors to perform the following steps:
    performing a global registration of a model image with respect to a runtime image;
    after global registration, identifying a displacement of predetermined image features in the model image with respect to the runtime image and computing a relative displacement therebetween so that local positioning of predetermined image features on the model image can be transformed with respect to the runtime image and thereafter determining if the relative displacement results in a better fit for the model image relative to the runtime image and, if not, the relative displacement is discarded or marked invalid; and
    inspecting the runtime image using the model image subsequent to the transformation of the predetermined image features.

10. The method as set forth in claim 9 wherein the step of computing the relative displacement includes connecting image edge points to derive model edge segments and connecting runtime image edge points to derive runtime edge segments, and matching the model edge segments with corresponding of the runtime edge segments.

11. The method as set forth in claim 10 wherein the step of computing includes determining a displacement between an enclosed segment feature in the model image and an enclosed segment feature in the runtime image.

12. The method as set forth in claim 11 wherein the step of computing includes determining respective displacements between pixels on a model image edge and pixels on a runtime image edge.

13. The method as set forth in claim 12 further comprising, determining, for each model image pixel, the displacements of nearby model edge pixels so as to derive a displacement with respect to a corresponding runtime image pixel.

14. The method and set forth in claim 13 wherein the step of determining the displacement of nearby model edge pixels includes dividing the model image and the runtime image, respectively, into bins and to average the displacements within each of the bins.

15. The system as set forth in claim 14 wherein the step of inspecting comprises at least one of area-based inspection and edge-segment based inspection.

16. The system as set forth in claim 9 wherein the step of inspecting comprises at least one of area-based inspection and edge-segment based inspection.

17. A method for inspecting an object comprising the steps of:
  implementing one or more processors to perform the following steps:
    performing a global registration of a runtime image of the object with respect to a model image;
    performing a flexible local repositioning of at least enclosed segment features and edge features and deriving respective displacement vectors therefor and thereafter determining if the respective displacement vectors result in a better fit for the model image relative to the runtime image and, if not, the respective displacement vectors are discarded or marked invalid;
    inspecting the runtime image using the model image with the enclosed segment features and the edge features of the model image being locally repositioned within predetermined threshold values so that flaws falling within the locally repositioned model image are disregarded and flaws falling outside the locally repositioned model image are indicated.

\* \* \* \* \*